United States Patent
Zhou et al.

(10) Patent No.: US 11,050,081 B2
(45) Date of Patent: Jun. 29, 2021

(54) SOLID ELECTROLYTE AND PREPARATION METHOD THEREOF, AND ELECTROCHEMICAL DEVICE AND ELECTRONIC DEVICE COMPRISING SAME

(71) Applicant: NINGDE AMPEREX TECHNOLOGY LIMITED, Ningde (CN)

(72) Inventors: Molin Zhou, Ningde (CN); Feng Gu, Ningde (CN); Leimin Xu, Ningde (CN); Jianming Zheng, Ningde (CN)

(73) Assignee: NINGDE AMPEREX TECHNOLOGY LIMITED, Ningde (CN)

( * ) Notice: Subject to any disclaimer, the term of this patent is extended or adjusted under 35 U.S.C. 154(b) by 56 days.

(21) Appl. No.: 16/458,510

(22) Filed: Jul. 1, 2019

(65) Prior Publication Data
US 2020/0295399 A1    Sep. 17, 2020

(30) Foreign Application Priority Data

Mar. 13, 2019  (CN) .......................... 201910188141.3

(51) Int. Cl.
*H01M 10/0562*    (2010.01)
*C01B 17/22*    (2006.01)
*C01B 17/42*    (2006.01)

(52) U.S. Cl.
CPC ......... *H01M 10/0562* (2013.01); *C01B 17/22* (2013.01); *C01B 17/42* (2013.01);
(Continued)

(58) Field of Classification Search
CPC ..... H01M 10/0562; C01B 17/22; C01B 17/42
See application file for complete search history.

(56) References Cited

U.S. PATENT DOCUMENTS

2010/0151335 A1*  6/2010  Senga ............... H01M 10/0562
                                                          429/322

FOREIGN PATENT DOCUMENTS

CN    102280660 A    12/2011
CN    102823049 A    12/2012
(Continued)

OTHER PUBLICATIONS

Feng, Jianghe, et al. "LiGa2PS6 and LiCd3PS6: molecular designs of two new mid-infrared nonlinear optical materials." Chemistry of Materials 30.11 (2018): 3901-3908. (Year: 2018).*
(Continued)

*Primary Examiner* — Maria Laios
*Assistant Examiner* — Grace Ann Kenlaw
(74) *Attorney, Agent, or Firm* — Juan Carlos A. Marquez; Marquez IP Law Office, PLLC

(57) ABSTRACT

Embodiments of the present application relate to a solid electrolyte and a preparation method thereof, and an electrochemical device and an electronic device comprising the same. The solid electrolyte of the present application includes a solid electrolyte material being represented by the chemical formula of $Li_{1+2x-2y}M_yGa_{2+x}P_{1-x}S_6$, where M is selected from the group consisting of Sr, Ba, Zn, Cd and a combination thereof, $0 \leq x \leq 0.2$ and $0 \leq y \leq 0.05$. Embodiments of the present application provides a solid electrolyte having good stability with lithium and ionic conductivity by forming the solid electrolyte using lower cost solid electrolyte materials and optimizing the material composition and a crystal structure thereof. At the same time, this also reduces the manufacturing costs of the solid electrolyte, and improves the structural stability of the solid electrolyte.

20 Claims, 7 Drawing Sheets

(52) U.S. Cl.
CPC ...... *C01P 2002/72* (2013.01); *C01P 2002/76* (2013.01); *C01P 2002/77* (2013.01); *C01P 2006/40* (2013.01); *H01M 2300/0068* (2013.01)

(56) References Cited

FOREIGN PATENT DOCUMENTS

| | | |
|---|---|---|
| CN | 103401018 A | 11/2013 |
| CN | 105556616 A | 5/2016 |
| CN | 107046149 A | 8/2017 |
| CN | 107851842 A | 3/2018 |
| CN | 109841898 A | 6/2019 |
| KR | 20170025617 A | 3/2017 |
| WO | 2013145480 A1 | 10/2013 |

OTHER PUBLICATIONS

International Search Report dated Mar. 4, 2020 in counterpart PCT application PCT/CN2019/123340, 5 pages.
Written Opinion dated Mar. 4, 2020 in counterpart PCT application PCT/CN2019/123340, 5 pages.
Chinese First Office Action dated Apr. 23, 2020 in counterpart Chinese application CN 201910188141.3, 7 pages in Chinese.
"LiGa2PS6 and LiCd3PS6: Molecular Designs of Two New Mid-Infrared Nonlinear Optical Materials," Feng et al., Chem. Mater., vol. 30, pp. 3901-3908, May 17, 2018.
"First principles study of the Li10GeP2S12 lithium super ionic conductor material," by Yifei Mo et al., Chemistry of Materials, 2012 (24) American Chemical Society, pp. 15-17.
"A lithium superionic conductor," by Noriaki Kamaya et al., Nature Materials, vol. 10, Sep. 2011, pp. 682-686.
"Synthesis of a new lithium ionic conductor, thio-LISICON-lithium germanium sulfide system," Ryoji Kanno et al., Solid State Ionics, 130 (2000), pp. 97-104.
"High-power all-solid-state batteries using sulfide superionic conductors," Yuki Kato et al., Nature Energy, vol. 1, Apr. 2016, pp. 1-7.
"Structural requirements for fast lithium ion migration in Li10GeP2S12," Stefan Adams et al., Journal of Materials Chemistry, 2012, 22, pp. 7687-7691.
"Solid state lithium secondary batteries using an amorphous solid electrolyte in the system (100-x) (0.6Li2S . 0.4SiS2) .Li4SiO4 obtained by mechanochemical synthesis," Solid State Ionics, 140 (2001), pp. 83-87.
"New, highly ion-conductive crystals precipitated from Li2S—P2S5 classes," Fuminori Mizuno et al., Advanced Materials, Apr. 4, 2005, 17, No. 7, pp. 918-921.

\* cited by examiner

SOLID ELECTROLYTE AND PREPARATION METHOD THEREOF, AND ELECTROCHEMICAL DEVICE AND ELECTRONIC DEVICE COMPRISING SAME

CROSS REFERENCE TO RELATED APPLICATIONS

The present application claims the benefit of priority from the China Patent Application No. 201910188141.3, filed on 13 Mar. 2019, the disclosure of which is hereby incorporated by reference in its entirety.

BACKGROUND

1. Field of the Invention

Embodiments of the present application relate to the field of electrochemical device technologies, and in particular, to a solid electrolyte and preparation methods thereof.

2. Description of the Related Art

The following description and examples are not to be considered as the prior art by virtue of their inclusion in this section.

Electrochemical devices (for example, lithium-ion batteries) have entered our daily lives with advancements in technology and environmental protection requirements. However, a conventional lithium-ion battery uses a flammable organic solvent as an electrolytic solution, so there is a great potential safety hazard. In particular, in order to meet performance requirements of an electronic device with high energy consumption for the electrochemical device, the energy density of the electrochemical device is ever increasing, and an attendant safety risk is becoming ever more prominent. Therefore, it is particularly important to investigate electrochemical devices with good safety performance.

In order to resolve the above safety problems, the introduction of solid electrolytes instead of organic electrolytic solutions is one feasible solution. However, the structural composition of the solid electrolyte affects its ionic conductivity, chemical stability or manufacturing cost. Therefore, it is necessary to further improve the structural composition of the solid electrolyte to obtain a solid electrolyte having both high ionic conductivity and good chemical stability.

SUMMARY

In view of the problems in the prior art, an objective of the present application is to provide a solid electrolyte having an optimized material composition and a crystal structure and an electrochemical device assembled therefrom.

Some embodiments of the present application provide a solid electrolyte, comprising a solid electrolyte material being represented by the chemical formula of $Li_{1+2x-2y}M_yGa_{2+x}P_{1-x}S_6$, where M is selected from the group consisting of strontium (Sr), barium (Ba), zinc (Zn), cadmium (Cd) and a combination thereof, $0 \leq x \leq 0.2$ and $0 \leq y \leq 0.05$.

According to some embodiments of the present application, the solid electrolyte material belongs to a monoclinic crystal system and has a crystal structure of a diamond-like structure.

According to some embodiments of the present application, the crystal structure is composed of corner-sharing tetrahedral structural units.

According to some embodiments of the present application, the space group of the crystal structure of the solid electrolyte material is Cc, and the primitive vectors of a unit cell of the solid electrolyte material are $a=11.373\pm0.5$ Å, $b=6.946\pm0.5$ Å and $c=11.401\pm0.5$ Å.

According to some embodiments of the present application, the solid electrolyte further includes a binder, where the mass percentage of the binder is about 10% to about 20% based on the total mass of the solid electrolyte, and the binder is selected from the group consisting of polypropylene, polyethylene, poly(ethylene oxide), polyphenylene oxide, polyvinylidene fluoride, a vinylidene fluoride-hexafluoropropylene copolymer, polyamide, polyacrylonitrile, polyacrylate ester, polyacrylic acid, polyacrylate salt, carboxymethyl cellulose sodium, polyvinylpyrrolidone, polyvinyl ether, polymethyl methacrylate, polytetrafluoroethylene, polyhexafluoropropylene, styrene-butadiene rubber and a combination thereof.

According to some embodiments of the present application, the solid electrolyte material has ionic conductivity of about $10^{-6}$ S/cm to about $10^{-4}$ S/cm and the lithium ion migration barrier of less than about 0.4 eV.

Some embodiments of the present application provide a method for preparing a solid electrolyte, comprising the following steps: mixing a lithium (Li)-containing material, an M-containing material, a gallium (Ga)-containing material, a phosphorus (P)-containing material and a sulfur (S)-containing material according to a stoichiometric ratio of $Li_{1+2x-2y}M_yGa_{2+x}P_{1-x}S_6$ to form a mixture, where M is selected from the group consisting of Sr, Ba, Zn, Cd and a combination thereof, $0 \leq x \leq 0.2$ and $0 \leq y \leq 0.05$; heating the mixture to a solid phase reaction critical temperature, and then cooling to obtain a solid electrolyte material; and forming the solid electrolyte by using the solid electrolyte material.

According to some embodiments of the present application, the step of heating the mixture to a solid phase reaction critical temperature includes heating the mixture to a range from about 550° C. to about 800° C.

According to some embodiments of the present application, the step of forming the solid electrolyte by using the solid electrolyte material further includes: conducting a cold pressing or hot pressing process on the solid electrolyte material to form the solid electrolyte.

According to some embodiments of the present application, the step of forming the solid electrolyte by using the solid electrolyte material further includes: mixing a binder with the solid electrolyte material before conducting the cold pressing or hot pressing process, where the mass percentage of the binder is about 10% to about 20% based on the total mass of the solid electrolyte, and the binder is selected from the group consisting of polypropylene, polyethylene, poly(ethylene oxide), polyphenylene oxide, polyvinylidene fluoride, a vinylidene fluoride-hexafluoropropylene copolymer, polyamide, polyacrylonitrile, polyacrylate ester, polyacrylic acid, polyacrylate salt, carboxymethyl cellulose sodium, polyvinylpyrrolidone, polyvinyl ether, polymethyl methacrylate, polytetrafluoroethylene, polyhexafluoropropylene, styrene-butadiene rubber and a combination thereof.

Some embodiments of the present application provide an electrochemical device, comprising: a cathode, an anode, and the solid electrolyte according to the above embodiments.

Some embodiments of the present application provide an electronic device, comprising the electrochemical device in the above embodiments.

According to the embodiments of the present application, a solid electrolyte material of lower cost is used to optimize the material composition and a crystal structure of the solid electrolyte to obtain a germanium (Ge)-free solid electrolyte material. The solid electrolyte material has good stability with lithium and ionic conductivity, can effectively reduce preparation cost of the solid electrolyte and improve the structural stability of the material.

BRIEF DESCRIPTION OF THE DRAWINGS

The drawings that are necessary to describe the embodiments of the present application or the prior art will be briefly described below to facilitate the description of the embodiments of the present application. The drawings described below are only part of the embodiments of the present application.

DETAILED DESCRIPTION

Figure 1:
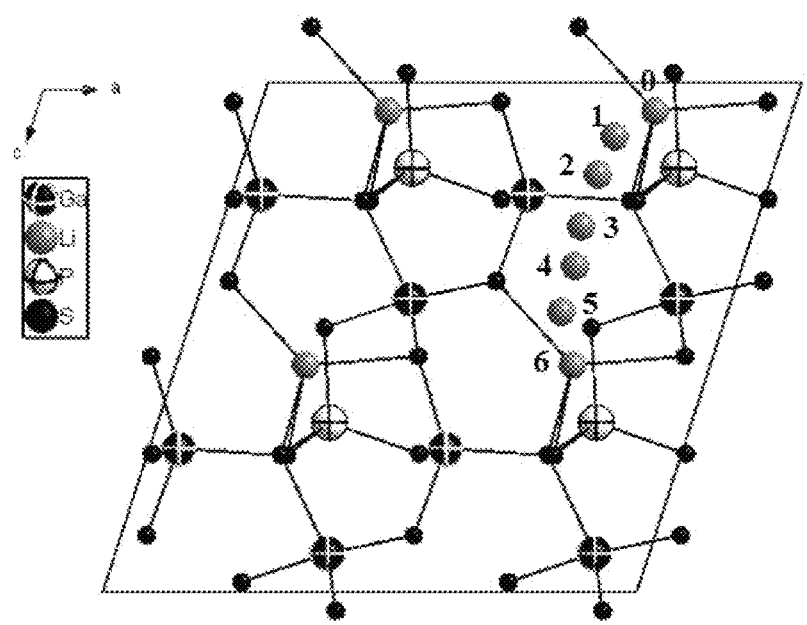
FIG. 1 is a schematic diagram of a crystal structure and a lithium ion migration pathway of a solid electrolyte material according to some embodiments of the present application.

In order to make the objectives, technical solutions and advantages of the present application more clear, the technical solutions of the present application will be clearly and completely described in the following with reference to the embodiments of the present application. It is apparent that the described embodiments are a part of the embodiments of the present application, rather than all of the embodiments. All other embodiments obtained by those skilled in the art based on the technical solutions provided by the present application and without the creative work are all within the scope of the present application.

In the detailed description and the claims of the present application, a list of items connected by the term "one of" may mean any of the listed items. For example, if items A and B are listed, then the phrase "one of A and B" means only A or only B. In another example, if items A, B, and C are listed, then the phrase "one of A, B and C" means only A; only B; or only C. The item A may include a single component or multiple components. The item B may include a single component or multiple components. The item C may include a single component or multiple components.

In the detailed description and the claims of the present application, a list of items connected by the term "at least one of" may mean any combination of the listed items. For example, if items A and B are listed, then the phrase "at least one of A and B" means only A; only B; or A and B. In another example, if items A, B and C are listed, then the phrase "at least one of A, B and C" means only A; or only B; only C; A and B (excluding C); A and C (excluding B); B and C (excluding A); or all of A, B and C. The item A may include a single component or multiple components. The item B may include a single component or multiple components. The item C may include a single component or multiple components.

In addition, amounts, ratios and other numerical values are sometimes presented herein in a range format. It should be understood that such range formats are for convenience and brevity, and should be interpreted with flexibility, and include not only those numerical values that are specifically designated as range limitations, but also include all individual numerical values or sub-ranges that are within the range, as each value and sub-range is specified explicitly.

In the detailed description and the claims of the present application, the terms "substantially", "generally", "essentially" and "about" are used to describe and illustrate small variations. When being used in combination with an event or circumstance, the term may refer to an example in which the event or circumstance occurs precisely, and an example in which the event or circumstance occurs approximately. For example, when being used in combination with a value, the term may refer to a variation range of less than or equal to ±10% of the value, for example, less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. In addition, amounts, ratios and other numerical values are sometimes presented herein in a range format. It should be appreciated that such range formats are for convenience and conciseness, and should be flexibly understood as comprising not only values explicitly specified to range constraints, but also all individual values or sub-ranges within the ranges, like explicitly specifying each value and each sub-range.

Since the solid electrolyte has characteristics of being non-flammable, non-corrosive, non-volatile, and free from liquid leakage problems, the all-solid-state electrochemical device prepared by using the solid electrolyte is extremely safe. At the same time, the all-solid-state electrochemical device has the advantages of long service life, high theoretical energy density and the like. In an electrochemical device using an organic electrolytic solution (such as a lithium-ion battery), the organic electrolytic solution repeatedly generates and destroys a solid-electrolyte interface (SEI) film during each charge-discharge cycle, resulting in a rapid decline in the capacity of the electrochemical device, which in turn seriously affects the service life of the electrochemical device. However, the solid electrolyte completely solves this problem. Furthermore, the solid electrolyte generally has good mechanical strength and can effectively resist the puncturing by lithium dendrites, and thus, can also improve the charge-discharge cycling performance and service life of the electrochemical device. In addition, since the solid electrolyte generally has a wide electrochemical window, the solid electrolyte can match cathode materials with high electrical potential, and the all-solid-state electrochemical device can simplify a thermal management system of the electrochemical device, so that the energy density thereof is greatly improved.

In recent years, there have been a lot of researches and improvements in solid electrolytes. Common solid electrolytes generally fall into three broad categories: polymer type, oxide type, and sulfide type. The polymer type solid electrolytes include poly(ethylene oxide) (PEO) based, polyphenylene oxide (PPO) based, polyacrylonitrile (PAN) based, polymethyl methacrylate (PMMA) based, polyvinylidene fluoride (PVDF) based and the like. Such electrolytes have characteristics of light weight, good viscoelasticity and excellent machinability, but have low ionic conductivity and poor rate capability. The oxide type solid electrolytes include, by crystal structure, a Perovskite type (e.g., $Li_{0.5}La_{0.5}TiO_3$), an Anti-Perovskite type (e.g., $Li_3OCl$), a NASICON type (e.g., $Li_{1+x}Al_xTi_{2-x}(PO_4)_3$, $0 \leq x \leq 0.4$) and a Garnet type (e.g., $Li_7La_3Zr_2O_{12}$), etc. Such electrolytes have good chemical stability and can exist stably in the atmosphere, but have poor compatibility with cathode and anode materials. The sulfide type solid electrolytes generally have high ionic conductivity, low grain boundary resistance and good machinability. In 2011, Kamaya et al. disclosed a phosphorous sulfide crystalline electrolyte $Li_{10}GeP_2S_{12}$ (LGPS) having lithium ion three-dimensional conduction pathway (Kamaya et al., "A lithium superionic conductor", 2011, Nature Materials, Volume 10, Pages 682-686), and its room-temperature conductivity reached $1.2 \times 10^{-2}$ S/cm. However, the LGPS materials also present some problems. First, the material composition thereof contains expensive metal material Ge, which makes the source material cost very high and is not conducive to large-scale application. Second, in 2012, Ceder et al. (Ceder et al., "First principles study of the $Li_{10}GeP_2S_{12}$ lithium super ionic conductor material", 2012, Chemistry of Materials, Volume 24, Pages 15-17) studied the stability with lithium of the LGPS material by first principles, and the results showed that the LGPS material was unstable to lithium. Third, Rao et al. (Rao et al., "Structural requirements for fast lithium ion migration in $Li_{10}GeP_2S_{12}$", 2012, Journal of Materials Chemistry, Volume 22, Pages 7687-7691) determined that the LGPS material has high symmetry due to its molecular structure through molecular dynamics simulation, and there are a large number of lithium vacancies, which makes its crystal structure unstable.

In order to overcome the above problems, the present application provides a novel sulfide solid electrolyte having good chemical stability by optimizing the composition of the solid electrolyte material to reduce processing environment requirements and manufacturing costs of the solid electrolyte and also improve the safety of the solid electrolyte.

The above non-patent documents "A lithium superionic conductor, Kamaya et al., 2011", "First principles study of the $Li_{10}GeP_2S_{12}$ lithium super ionic conductor material, Ceder et al., 2012" and "Structural requirements for fast lithium ion migration in $Li_{10}GeP_2S_{12}$, Rao et al., 2012" exemplify several exemplary descriptions of structural analysis and first-principles simulation of the solid electrolyte material in the embodiments of the present application, which are hereby incorporated by reference in their entireties.

Embodiments of the present application provide a solid electrolyte, comprising a solid electrolyte material being represented by the chemical formula of $Li_{1+2x-2y}M_yGa_{2+x}P_{1-x}S_6$, where M is selected from the group consisting of Sr, Ba, Zn, Cd and a combination thereof, $0 \leq x \leq 0.2$ and $0 \leq y \leq 0.05$.

The lithium ion conductivity and beneficial effects of the solid electrolyte material in the embodiments of the present application will be described below with reference to FIG. 1 and FIG. 2.

FIG. 1 is a schematic diagram of a crystal structure and a lithium ion migration pathway of a solid electrolyte material $LiGa_2PS_6$ according to some embodiments of the present application. As shown in FIG. 1, in some embodiments of the present application, the solid electrolyte material belongs to a monoclinic crystal system and has a crystal structure of a diamond-like structure. The crystal structure is entirely composed of corner-sharing tetrahedral structural units, where the tetrahedral structural unit includes $LiS_4$, $MS_4$ (when M is present), $GaS_4$ and $PS_4$. The crystal structure has densely arranged groups, and moderate concentration of defects such as vacancies and interstitial atoms, and thus, has good structural stability. In addition, the solid electrolyte material has a relatively simple composition and is free of the expensive metal element Ge, and also has good lithium ion conductivity and stability with lithium.

In some embodiments of the present application, the space group of the crystal structure of the solid electrolyte material is Cc, and the primitive vectors of a unit cell of the solid electrolyte material are $a=11.373\pm0.5$ Å, $b=6.946\pm0.5$ Å and $c=11.401\pm0.5$ Å.

Figure 2:
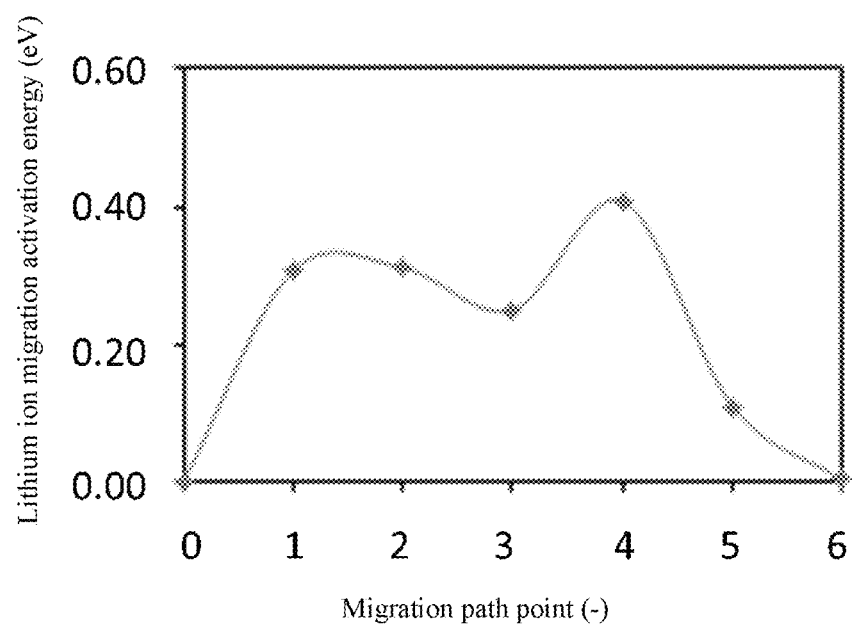
FIG. 2 is a curve diagram of a lithium ion migration barrier on the lithium ion migration pathway according to FIG. 1.

FIG. 2 is a curve diagram of a lithium ion migration pathway from node 0 to node 6 set in the crystal structure of FIG. 1 and a lithium ion lattice activation energy (i.e., lithium ion migration barrier) obtained by first-principles simulation calculation. As shown in FIG. 2, the migration barrier of lithium ions in the crystal structure of the solid electrolyte material $LiGa_2PS_6$ in the lithium ion migration pathway is not greater than 0.4 eV, where the first-principles simulation is performed by using the VASP software package (Vienna University's Hafner Task Force, Vienna Ab-initio Simulation Package) to calculate the lithium ion migration barrier of the solid electrolyte material $LiGa_2PS_6$. Since the solid electrolyte material has multi-directional lithium ion conduction pathways, such as the lithium ion migration pathway in FIG. 1, the lattice activation energy is relatively low, lithium ion migration is thus easier and the ion conductivity is larger.

In some embodiments of the present application, the solid electrolyte material has the ionic conductivity of about $10^{-6}$ S/cm to about $10^{-4}$ S/cm and the lithium ion migration barrier of less than about 0.4 eV.

According to some embodiments of the present application, the solid electrolyte may further include a binder. In some embodiments of the present application, the mass percentage of the binder is about 10% to about 20% based on the total mass of the solid electrolyte, where the binder is selected from the group consisting of polypropylene, polyethylene, poly(ethylene oxide), polyphenylene oxide, polyvinylidene fluoride, a vinylidene fluoride-hexafluoropropylene copolymer, polyamide, polyacrylonitrile, polyacrylate ester, polyacrylic acid, polyacrylate salt, carboxymethyl cellulose sodium, polyvinylpyrrolidone, polyvinyl ether, polymethyl methacrylate, polytetrafluoroethylene, polyhexafluoropropylene, styrene-butadiene rubber and a combination thereof.

Figure 3:
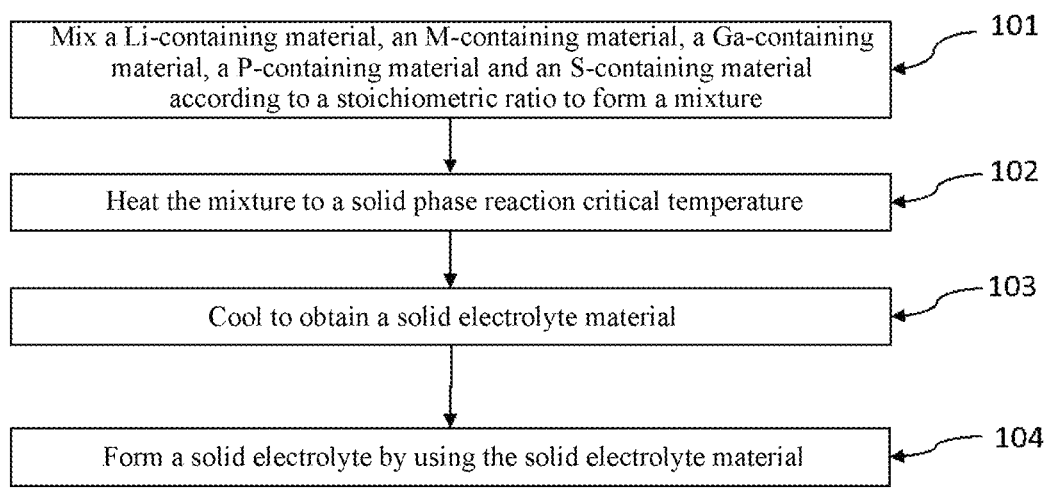
FIG. 3 is a flowchart of a preparation method of a solid electrolyte according to some embodiments of the present application.

The preparation method of a solid electrolyte provided by the present application will be described below with reference to FIG. 3. FIG. 3 is a flowchart of a preparation method of a solid electrolyte according to some embodiments of the present application.

As shown in FIG. 3, according to some embodiments of the present application, the preparation method of a solid electrolyte includes preparation of a solid electrolyte material and assembly of the solid electrolyte, where the preparation method of the solid electrolyte material may employ a high-temperature solid phase method. The high-temperature solid phase preparation method includes the following steps: step 101: a lithium (Li)-containing material, an M-containing material, a gallium (Ga)-containing material, a phosphorus (P)-containing material and a sulfur (S)-containing material for forming the solid electrolyte material ($Li_{1+2x-2y}M_yGa_{2+x}P_{1-x}S_6$) are mixed according to a stoichiometric ratio of $Li_{1+2x-2y}M_yGa_{2+x}P_{1-x}S_6$ in an inert gas atmosphere to form a mixture, where M is selected from the group consisting of Sr, Ba, Zn, Cd, and a combination thereof, $0 \leq x \leq 0.2$ and $0 \leq y \leq 0.05$. In some embodiments of the present application, the lithium (Li)-containing material, the M-containing material, the gallium (Ga)-containing material, the phosphorus (P)-containing material and the sulfur (S)-containing material may be an elemental material such as, but is not limited to, lithium metal or a gallium material, or a binary material such as, but is not limited to, lithium sulfide ($Li_2S$), gallium sulfide ($Ga_2S_3$) and phosphorus pentasulfide ($P_2S_5$).

Step 102: the mixture formed in step 101 is placed in a vacuum quartz tube such that the pressure in the quartz tube is about $10^{-5}$ Pa to about $10^{-3}$ Pa, then the mixture is heated in a heater at a heating rate of about 0.1° C./min to about 10° C./min to a sintering temperature of about 550° C. to about 800° C. such that the mixture reaches the solid phase reaction critical temperature, and the sintering temperature is held for about 8 hours to about 40 hours. In other embodiments of the present application, the heating rate is about 1° C./min to about 5° C./min. In other embodiments of the present application, the sintering temperature includes about 600° C., about 650° C. and about 700° C.

Step 103: the high-temperature mixture in step 102 is cooled to obtain the solid electrolyte material ($Li_{1+2x-2y}M_yGa_{2+x}P_{1-x}S_6$).

It will be understood by those skilled in the art that although step 101 to step 103 in FIG. 3 are used to synthesize the solid electrolyte material by a high-temperature solid phase method, they are merely exemplary embodiments for illustrating the preparation method of the solid electrolyte according to some embodiments of the present application. Those skilled in the art can adopt any suitable chemical synthesis method in the art according to actual implementation needs without limitation. For example, the preparation method of the solid electrolyte material ($Li_{1+2x-2y}M_yGa_{2+x}P_{1-x}S_6$) according to some embodiments of the present application further includes, but is not limited to, a melt quenching method or a high energy ball milling-annealing method.

In some embodiments of the present application, the steps of using the melt quenching method and the high-temperature solid phase synthesis method to prepare the solid electrolyte material are substantially the same. The difference is that in the melt quenching method, in step 101, after forming the mixture, the mixture is further subjected to a cold pressing process, in which the mixture is cold-pressed at the pressure of about 10 MPa to about 100 MPa for about 1 minute to about 10 minutes to form a thin slice; in step 102, the slice is placed in a vacuum quartz tube instead, heated at a heating rate of about 1° C./min to about 5° C./min to a sintering temperature of about 650° C. to about 800° C., and held at the sintering temperature for about 1 hour to about 10 hours; and in step 103, the cooling strategy used is to take out the quartz tube and quench the quartz tube to room temperature in a cold water bath.

In some embodiments of the present application, the steps of using the high energy ball milling-annealing method and the high-temperature solid phase synthesis method to prepare the solid electrolyte material are substantially the same. The difference is that in the high energy ball milling-annealing method, step 101 includes the following steps: after mixing the lithium (Li)-containing material, the M-containing material, the gallium (Ga)-containing material, the phosphorus (P)-containing material and the sulfur (S)-containing material according to a stoichiometric ratio of $Li_{1+2x-2y}M_yGa_{2+x}P_{1-x}S_6$, the mixture is placed in a ball mill filled with inert gas and subsequently ball-milled at a speed of from about 300 rpm to about 600 rpm for about 8 hours to about 80 hours by a high energy ball milling process, where the weight ratio of grinding balls to the mixture is about 20:1 to about 60:1, the mixture is cooled for about 10 minutes to about 20 minutes after each ball milling for about 30 minutes to about 60 minutes, and after the high energy ball milling process is used, the mixture is subjected to a cold pressing process, in which the mixture is cold-pressed at the pressure of about 10 MPa to about 100 MPa for about 1 minute to about 10 minutes to form a thin slice; and in step 102, the slice is placed in a vacuum quartz tube instead and heated at a heating rate of about 1° C./min to about 5° C./min to a sintering temperature of about 550° C. to about 650° C. In some embodiments of the present application, the thickness of the slice formed by the cold pressing process in step 101 is about 100 μm to about 400 μm.

In some embodiments of the present application, the preparation method of a solid electrolyte includes the following step: after forming the solid electrolyte material ($Li_{1+2x-2y}M_yGa_{2+x}P_{1-x}S_6$) of the present application in step 103, the solid electrolyte is formed by using the solid electrolyte material (step 104). The step of forming the solid electrolyte includes, but is not limited to, using a cold pressing process or a hot pressing process to combine the solid electrolyte material to form the solid electrolyte. It should be understood by those skilled in the art that the solid electrolyte material ($Li_{1+2x-2y}M_yGa_{2+x}P_{1-x}S_6$) of the present application can be prepared to form a solid electrolyte by any solid electrolyte preparation method known in the art according to actual needs without limitation.

In some embodiments of the present application, step 104 of forming the solid electrolyte from the solid electrolyte material by a cold pressing process or a hot pressing process includes the following step: the solid electrolyte material formed in step 103 is placed in a mold, and is pressed at a normal temperature or a temperature of about 60° C. to about 80° C. at the pressure of about 200 MPa to about 300 MPa to obtain the solid electrolyte.

In some embodiments of the present application, the step of forming the solid electrolyte (step 104) may further include the following step: before conducting the cold pressing or hot pressing process, mixing a binder with the solid electrolyte material. In some embodiments of the present application, the binder is selected from the group consisting of polypropylene, polyethylene, poly(ethylene oxide), polyphenylene oxide, polyvinylidene fluoride, a vinylidene fluoride-hexafluoropropylene copolymer, polyamide, polyacrylonitrile, polyacrylate ester, polyacrylic acid, polyacrylate salt, carboxymethyl cellulose sodium, polyvinylpyrrolidone, polyvinyl ether, polymethyl methacrylate, polytetrafluoroethylene, polyhexafluoropropylene, styrene-butadiene rubber and a combination thereof.

In some embodiments of the present application, the content of the solid electrolyte material in the solid electrolyte is about 80% to about 90% based on the total mass of the solid electrolyte, and the content of the binder in the solid electrolyte is about 10% to about 20% based on the total mass of the solid electrolyte.

Some embodiments of the present application provide an electrochemical device, comprising a cathode, an anode and the solid electrolyte material of the above embodiments.

In some embodiments of the present application, the cathode may be, but is not limited to, metal lithium foil.

In some embodiments of the present application, the cathode includes the solid electrolyte material, a cathode active material and a conductive agent.

In some embodiments of the present application, the content of the solid electrolyte material in the cathode is about 30% to about 40% based on the total mass of the cathode; the content of the cathode active material in the cathode is about 40% to about 60% based on the total mass of the cathode; and the content of the conductive agent in the cathode is about 10% to about 20% based on the total mass of the cathode.

In some embodiments of the present application, examples of the cathode active material may include at least one of lithium cobalt oxide, lithium iron phosphate, lithium manganese iron phosphate, sodium iron phosphate, lithium vanadium phosphate, sodium vanadium phosphate, oxylithium vanadium phosphate, oxysodium vanadium phosphate, lithium vanadate, lithium manganate, lithium nickelate, lithium nickel cobalt manganate, lithium-rich manganese-based material, lithium nickel cobalt aluminate and lithium titanate.

In the above cathode active material, the chemical formula of the lithium cobalt oxide may be $Li_aCo_bM_{1c}O_{2-d}$, where $M_1$ is selected from at least one of nickel (Ni), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), tungsten (W), yttrium (Y), lanthanum (La), zirconium (Zr) and silicon (Si), and the values of a, b, c and d are respectively in the following ranges: $0.8 \le a \le 1.2$, $0.8 \le b \le 1$, $0 \le c \le 0.2$, and $-0.1 \le d \le 0.2$;

In the above cathode active material, the chemical formula of the lithium nickelate may be $Li_eNi_fM_{2g}O_{2-h}$, where $M_2$ is selected from at least one of cobalt (Co), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), tungsten (W), zirconium (Zr) and silicon (Si), and the values of e, f, g and h are respectively in the following ranges: $0.8 \le e \le 1.2$, $0.3 \le f \le 0.98$, $0.02 \le g \le 0.7$, and $-0.1 \le h \le 0.2$;

In the above cathode active material, the chemical formula of the lithium manganate is $Li_iMn_{2-j}M_{3j}O_{4-k}$, where $M_3$ is selected from at least one of cobalt (Co), nickel (Ni), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr) and tungsten (W), and the values of i, j and k are respectively in the following ranges: $0.8 \le i \le 1.2$, $0 \le j \le 1.0$ and $-0.2 \le k \le 0.2$.

In the above cathode active material, the chemical formula of the lithium nickel cobalt manganate is $LiNi_lCo_m$-$Mn_nO_2$, where the values of l, m and n are respectively in the following ranges: $0 < l < 1.0$, $0 < m < 1.0$ and $0 < n < 1.0$, and $l+m+n=1$.

In some embodiments of the present application, the conductive agent includes at least one of conductive carbon black, carbon fibers, acetylene black, Ketjen black, graphene and carbon nanotubes.

In some embodiments of the present application, the anode may be, but is not limited to, metal lithium foil.

In some embodiments of the present application, the anode further includes an anode material capable of absorbing and releasing lithium (Li) (hereinafter, sometimes referred to as "an anode material capable of absorbing/releasing lithium (Li)"). Examples of the anode material capable of absorbing/releasing lithium (Li) may include carbon materials, metal compounds, oxides, sulfides, nitrides of lithium such as $LiN_3$, lithium metal, metals forming alloys together with lithium, and polymer materials.

Examples of the carbon material may include low graphitized carbon, easily graphitized carbon, artificial graphite, natural graphite, mesocarbon microbeads, soft carbon, hard carbon, pyrolytic carbon, coke, vitreous carbon, an organic polymer compound sintered body, carbon fibers and active carbon. The coke may include pitch coke, needle coke and petroleum coke. The organic polymer compound sintered body refers to a material obtained by calcining a polymer material such as phenol plastic or furan resin at an appropriate temperature to carbonize the polymer material, and some of these materials are classified into low graphitized carbon or easily graphitized carbon. Examples of the polymer material may include polyacetylene and polypyrrole.

Furthermore, the anode material capable of absorbing/releasing lithium (Li) may include elemental lithium metal, metal elements and semimetal elements capable of forming alloys together with lithium (Li), alloys and compounds comprising such elements, and the like. For example, they are used together with carbon materials due to the good cycling performance and high energy density can be obtained in this case. In addition to the alloys comprising two or more metal elements, the alloys used herein also include alloys comprising one or more metal elements and one or more semi-metal elements. The alloy may be in the form of a solid solution, a eutectic crystal (eutectic mixture), an intermetallic compound, and a mixture thereof.

Examples of the metal elements and the semimetal elements may include tin (Sn), lead (Pb), aluminum (Al), indium (In), silicon (Si), zinc (Zn), antimony (Sb), bismuth (Bi), cadmium (Cd), magnesium (Mg), boron (B), gallium (Ga), germanium (Ge), arsenic (As), silver (Ag), zirconium (Zr), yttrium (Y) and hafnium (Hf). Examples of the above alloys and compounds may include a material having a chemical formula: $Ma_sMb_tLi_u$ and a material having a chemical formula: $Ma_pMc_qMd_r$. In these chemical formulae, Ma represents at least one of metal elements and semimetal elements capable of forming an alloy together with lithium; Mb represents at least one of metal elements and semimetal elements other than lithium and Ma; Mc represents at least one of the non-metal elements; Md represents at least one of metal elements and semimetal elements other than Ma; and s, t, u, p, q and r satisfy $s>0$, $t \ge 0$, $u \ge 0$, $p>0$, $q>0$ and $r \ge 0$.

In addition, an inorganic compound not comprising lithium (Li), such as $MnO_2$, $V_2O_5$, $V_6O_{13}$, NiS and MoS, may be used in the anode.

Some embodiments of the present application further provide a preparation method of the electrochemical device, comprising the following steps: the solid electrolyte material according to the embodiments of the present application, the cathode active material and the conductive agent are sufficiently ground and physically mixed uniformly, then the uniformly mixed powder and the solid electrolyte in the above embodiment are placed in a mold and pressed under the pressure of about 100 MPa to about 400 MPa by a cold pressing process to form a cathode-solid electrolyte double-layer sheet, the anode is placed on the surface of the double-layer sheet on the side of the solid electrolyte, the anode and the double-layer sheet are together placed in a cold press mold and pressed under the pressure of about 100 MPa to about 400 MPa by a cold pressing process to form an electrode assembly, and the electrode assembly is packaged to complete the preparation of the electrochemical device.

Those skilled in the art will appreciate that while the above is illustrated with a lithium-ion battery, the electrochemical device of the present application further includes any other suitable electrochemical device. The electrochemical device in the embodiments of the present application includes any device that generates an electrochemical reaction without departing from the disclosed content of the present application, and its specific examples include all kinds of primary batteries, secondary batteries, solar cells or capacitors. In particular, the electrochemical device is a lithium secondary battery, comprising a lithium metal secondary battery, a lithium ion secondary battery, a lithium polymer secondary battery, or a lithium ion polymer secondary battery.

The use of the electrochemical device of the present application is not particularly limited and can be used for any use known in the prior art. In some embodiments of the present application, the electrochemical device of the present application may be used for, but is not limited to, a notebook computer, a pen input computer, a mobile computer, an e-book player, a portable phone, a portable fax machine, a portable copy machine, a portable printer, stereo headphones, a video recorder, a liquid crystal display television, a portable cleaner, a portable CD player, a mini disc player, a transceiver, an electronic notebook, a calculator, a memory card, portable recorder, a radio, a backup power, a motor, a car, a motorcycle, a power bicycles, a bicycle, a lighting fixture, a toy, a game console, a clock, an electric tool, a flash lamp, a camera, a large household battery, a lithium-ion capacitor and the like.

The technical solution of the present invention will be further described below in conjunction with the comparative examples and specific embodiments, but is not limited thereto. It will be understood by those skilled in the art that the preparation methods described in the present application are merely exemplary embodiments, and any modification or equivalent substitute of the technical solutions of the present invention without departing from the scope of the technical solutions of the present invention shall be included in the protection scope of the present invention.

Specific Embodiments

Preparation of a Solid Electrolyte Material and a Solid Electrolyte:

Embodiment 1

Preparation of a solid electrolyte material $Li_{1+2x-2y}M_yGa_{2+x}P_{1-x}S_6$ (where M=Ba, x=0.2, and y=0.05) powder:

According to a high-temperature solid phase method, the binary materials of lithium sulfide, barium sulfide, gallium sulfide and phosphorus pentasulfide (according to a stoichiometric ratio of Li:Ba:Ga:P:S=1.3:0.05:2.2:0.8:6) were physically mixed uniformly, the resulting mixture was then placed into a vacuum quartz tube having the pressure of $10^{-4}$ Pa, then the mixture was heated in a tube furnace at a heating rate of 3° C./min to a sintering temperature of 600° C., held at the sintering temperature for about 12 hours and naturally cooled to room temperature, and the obtained product was pulverized and ground to obtain the solid electrolyte material powder.

Preparation of a Solid Electrolyte:

According to a cold pressing process, the above solid electrolyte material powder was placed in a mold and cold-pressed under the pressure of 300 MPa to obtain the sheet-shaped solid electrolyte.

Embodiment 2

The preparation method is the same as that in Embodiment 1. The difference is that in the preparation of the solid electrolyte of Embodiment 2, after the solid electrolyte material powder and poly(ethylene oxide) were mixed according to a weight ratio of 8:2, according to a hot pressing process, the solid electrolyte material powder-poly(ethylene oxide) mixture was placed in a mold, and hot-pressed at a temperature of 70° C. and at the pressure of 300 MPa to obtain a sheet-shaped solid electrolyte.

Embodiment 3

Preparation of a solid electrolyte material $Li_{1+2x-2y}M_yGa_{2+x}P_{1-x}S_6$ (where M=Ba, x=0.2, and y=0.05) powder:

According to a melt quenching method, the binary materials of lithium sulfide, barium sulfide, gallium sulfide and phosphorus pentasulfide (according to a stoichiometric ratio of Li:Ba:Ga:P:S=1.3:0.05:2.2:0.8:6) were physically mixed uniformly, the formed mixture was then cold-pressed at the pressure of 100 MPa for 10 minutes by a cold pressing process to form a thin slice having the thickness of 300 μm, the slice was placed in a vacuum quartz tube having the pressure of $10^{-4}$ Pa, then the slice was heated in a tube furnace at a heating rate of 3° C./min to a sintering temperature of 700° C., held at the sintering temperature for about 5 hours and cooled with cold water to room temperature, and the obtained product was pulverized and ground to obtain the solid electrolyte material powder.

Preparation of a Solid Electrolyte:

According to a cold pressing process: the above solid electrolyte material powder was placed in a mold and cold-pressed under the pressure of 300 MPa to obtain the sheet-shaped solid electrolyte.

Embodiment 4

The preparation method is the same as that in Embodiment 3. The difference is that in the preparation of the solid electrolyte of Embodiment 4, after the solid electrolyte material powder and poly(ethylene oxide) were mixed according to a weight ratio of 8:2, according to a hot pressing process, the solid electrolyte material powder-poly(ethylene oxide) mixture was placed in a mold, and hot-pressed at a temperature of 70° C. and at the pressure of 300 MPa to obtain a sheet-shaped solid electrolyte.

Embodiment 5

Preparation of a solid electrolyte material $Li_{1+2x-2y}M_yGa_{2+x}P_{1-x}S_6$ (where M=Ba, x=0.2, and y=0.05) powder:

According to a high-energy ball milling-annealing method, the binary materials of lithium sulfide, barium sulfide, gallium sulfide and phosphorus pentasulfide (according to a stoichiometric ratio of Li:Ba:Ga:P:S=1.3:0.05:2.2:0.8:6) were physically mixed uniformly and placed in a ball mill filled with argon (Ar) gas, and then ball-milled at a speed of 300 rpm for 40 hours by a high-energy ball milling process, the grinding balls being 4 mm zirconium dioxide ($ZrO_2$) balls, the weight ratio of the grinding balls to the mixture being 20:1, and the mixture being cooled for 10 minutes after each ball milling for 30 minutes; and after using the high-energy ball milling process, the ball-milled mixture was cold-pressed at the pressure of 100 MPa for 10 minutes by a cold pressing process to form a thin slice having the thickness of 300 μm, the slice was placed in a vacuum quartz tube having the pressure of $10^{-4}$ Pa, then the slice was heated in a tube furnace at a heating rate of 3° C./min to a sintering temperature of 600° C., held at the sintering temperature for about 10 hours and naturally cooled to room temperature, and the obtained product was pulverized and ground to obtain the solid electrolyte material powder.

Preparation of a Solid Electrolyte:

According to a cold pressing process: the above solid electrolyte material powder was placed in a mold and cold-pressed under the pressure of 300 MPa to obtain a sheet-shaped solid electrolyte.

Embodiment 6

The preparation method is the same as that in Embodiment 5. The difference is that in Embodiment 6, the solid electrolyte material was $Li_{1+2x-2y}M_yGa_{2+x}P_{1-x}S_6$ (where M=Ba, x=0.2, and y=0), and the stoichiometric ratio was Li:Ba:Ga:P:S=1.4:0:2.2:0.8:6.

Embodiment 7

The preparation method is the same as that in Embodiment 5. The difference is that in Embodiment 7, the solid electrolyte material was $Li_{1+2x-2y}M_yGa_{2+x}P_{1-x}S_6$ (where M=Cd, x=0.1, and y=0.05), and the stoichiometric ratio was Li:Cd:Ga:P:S=1.1:0.05:2.1:0.9:6.

Embodiment 8

The preparation method is the same as that in Embodiment 5. The difference is that in Embodiment 8, the solid electrolyte material was $Li_{1+2x-2y}M_yGa_{2+x}P_{1-x}S_6$ (where M=Ba, x=0, and y=0.05), and the stoichiometric ratio was Li:Ba:Ga:P:S=0.9:0.05:2:1:6.

Embodiment 9

The preparation method is the same as that in Embodiment 5. The difference is that in Embodiment 9, the solid electrolyte material was $Li_{1+2x-2y}M_yGa_{2+x}P_{1-x}S_6$ (where M=Ba, x=0, and y=0), and the stoichiometric ratio was Li:Ba:Ga:P:S=1:0:2:1:6.

Embodiment 10

The preparation method is the same as that in Embodiment 5. The difference is that in the preparation of the solid electrolyte of Embodiment 10, after the solid electrolyte material powder and poly(ethylene oxide) were mixed according to a weight ratio of 8:2, according to a hot pressing process, the solid electrolyte material powder-poly(ethylene oxide) mixture was placed in a mold, and hot-pressed at a temperature of 70° C. and at the pressure of 300 MPa to obtain a sheet-shaped solid electrolyte.

Comparative Example 1

Preparation of $Li_{10}GeP_2S_{12}$ (LGPS) Powder:

The binary materials of lithium sulfide, germanium disulfide and phosphorus pentasulfide (according to the stoichiometric ratio of $Li_{10}GeP_2S_{12}$ provided in "A lithium superionic conductor, Kamaya et al., 2011", i.e., Li:Ge:P:S=10:1:2:12) were ball-milled and mixed uniformly, then the formed mixture was placed in a vacuum quartz tube, then the mixture was heated in a tube furnace at a heating rate of 3° C./min to the sintering temperature of 550° C. and held at the sintering temperature for about 8 hours, then the quartz tube was cooled to room temperature at a cooling rate of 5° C./h, and the obtained product was pulverized and ground to obtain the $Li_{10}GeP_2S_{12}$ (LGPS) powder.

Preparation of a Solid Electrolyte:

According to a cold pressing process, the above $Li_{10}GeP_2S_{12}$ (LGPS) powder was placed in a cold press mold, and cold-pressed under the pressure of 300 MPa to obtain a sheet-shaped solid electrolyte.

Comparative Example 2

The preparation method is the same as that in Embodiment 1. The difference is that the sintering temperature in the preparation of the solid electrolyte material $Li_{1+2x-2y}M_yGa_{2+x}P_{1-x}S_6$ (where M=Ba, x=0.2, and y=0.05) powder of Comparative Example 2 was 200° C.

Comparative Example 3

The preparation method is the same as that in Embodiment 1. The difference is that the sintering temperature in the preparation of the solid electrolyte material $Li_{1+2x-2y}M_yGa_{2+x}P_{1-x}S_6$ (where M=Ba, x=0.2, and y=0.05) powder of Comparative Example 3 was 1,000° C.

Comparative Example 4

The preparation method is the same as that in Embodiment 3. The difference is that the sintering temperature in the preparation of the solid electrolyte material $Li_{1+2x-2y}M_yGa_{2+x}P_{1-x}S_6$ (where M=Ba, x=0.2, and y=0.05) powder of Comparative Example 4 was 200° C.

Comparative Example 5

The preparation method is the same as that in Embodiment 3. The difference is that the sintering temperature in the preparation of the solid electrolyte material $Li_{1+2x-2y}M_yGa_{2+x}P_{1-x}S_6$ (where M=Ba, x=0.2, and y=0.05) powder of Comparative Example 5 was 1,000° C.

Comparative Example 6

Preparation of a solid electrolyte material $Li_{1+2x-2y}M_yGa_{2+x}P_{1-x}S_6$ (where M=Ba, x=0.2, and y=0.05) powder:

According to a high-energy ball milling method, the binary materials of lithium sulfide, barium sulfide, gallium sulfide and phosphorus pentasulfide (according to a stoichiometric ratio of Li:Ba:Ga:P:S=1.3:0.05:2.2:0.8:6) were physically mixed uniformly and placed in a ball mill filled with argon (Ar) gas, and then ball-milled at a speed of 300 rpm for 40 hours by a high-energy ball milling process to form the solid electrolyte material powder, the grinding balls being 4 mm zirconium dioxide ($ZrO_2$) balls, the weight ratio of the grinding balls to the mixture being 20:1, and the mixture being cooled for 10 minutes after each ball milling for 30 minutes to obtain the solid electrolyte material powder.

Preparation of a Solid Electrolyte:

According to a cold pressing process: the above solid electrolyte material powder was placed in a mold and cold-pressed under the pressure of 300 MPa to obtain the sheet-shaped solid electrolyte.

Comparative Example 7

The preparation method is the same as that in Embodiment 5. The difference is that the sintering temperature in the preparation of the solid electrolyte material $Li_{1+2x-2y}M_yGa_{2+x}P_{1-x}S_6$ (where M=Ba, x=0.2, and y=0.05) powder of Comparative Example 7 was 200° C.

Comparative Example 8

The preparation method is the same as that in Embodiment 5. The difference is that the sintering temperature in the preparation of the solid electrolyte material $Li_{1+2x-2y}M_yGa_{2+x}P_{1-x}S_6$ (where M=Ba, x=0.2, and y=0.05) powder of Comparative Example 8 was 1,000° C.

Preparation of an Electrochemical Device:

Embodiment 11

By using lithium metal foil as a cathode and an anode, the solid electrolyte prepared in Embodiment 1 was placed between two pieces of lithium metal foil (i.e., between the cathode and the anode), and packaged under the pressure of 5 MPa to obtain the symmetrically combined (lithium foil/solid electrolyte/lithium foil) electrochemical device (solid state lithium-ion battery).

Embodiment 12

The preparation method is the same as that in Embodiment 11. The difference is that Embodiment 12 employed the solid electrolyte prepared in Embodiment 3.

Embodiment 13

The preparation method is the same as that in Embodiment 11. The difference is that Embodiment 13 employed the solid electrolyte prepared in Embodiment 5.

Embodiment 14

The preparation method is the same as that in Embodiment 11. The difference is that Embodiment 14 employed the solid electrolyte prepared in Embodiment 7.

Embodiment 15

The preparation method is the same as that in Embodiment 11. The difference is that Embodiment 15 employed the solid electrolyte prepared in Embodiment 10.

Embodiment 16

The solid electrolyte material $Li_{1+2x-2y}M_yGa_{2+x}P_{1-x}S_6$ (where M=Ba, x=0.2, and y=0.05) powder in Embodiment 1, lithium iron phosphate ($LiFePO_4$) and conductive carbon black were sufficiently ground and physically mixed according to a mass ratio (solid electrolyte material:lithium iron phosphate:conductive carbon black=40%:50%:10%), and then the formed mixture and the solid electrolyte prepared in Embodiment 1 were together placed into a mold and cold-pressed under the pressure of 400 MPa to form a cathode-solid electrolyte double-layer sheet; and subsequently, lithium metal foil (anode) was placed on a surface of the double-layer sheet on a side of the solid electrolyte, the anode and the double-layer sheet were together placed in a cold press mold and pressed under the pressure of 200 MPa to form an electrode assembly, and then the electrode assembly was packaged to obtain the electrochemical device (solid state lithium-ion battery).

Embodiment 17

The preparation method is the same as that in Embodiment 16. The difference is that Embodiment 17 employed the solid electrolyte prepared in Embodiment 3.

Embodiment 18

The preparation method is the same as that in Embodiment 16. The difference is that Embodiment 18 employed the solid electrolyte prepared in Embodiment 5.

Embodiment 19

The preparation method is the same as that in Embodiment 16. The difference is that Embodiment 19 employed the solid electrolyte prepared in Embodiment 7.

Embodiment 20

The preparation method is the same as that in Embodiment 16. The difference is that Embodiment 20 employed the solid electrolyte prepared in Embodiment 10.

Comparative Example 9

The preparation method is the same as that in Embodiment 11. The difference is that Comparative Example 9 employed the solid electrolyte prepared in Comparative Example 1.

Comparative Example 10

The preparation method is the same as that in Embodiment 16. The difference is that Comparative Example 10 employed the solid electrolyte prepared in Comparative Example 1.

After the solid electrolytes and the electrochemical devices of the above embodiments and comparative examples were completed, the weights and sizes of the solid electrolyte and electrochemical device finished products were recorded. Next, the solid electrolyte material powder finished products of Embodiment 1 and Comparative Examples 2 and 3 above were subjected to an X-ray diffraction test to examine the crystal structure thereof. The solid electrolyte finished products of Embodiments 1-10 and Comparative Examples 1-8 above were subjected to an AC impedance test to obtain the ionic conductivity of the solid electrolyte. The electrochemical devices of Embodiments 11-15 and Comparative Example 9 above were subjected to charge/discharge testing at a constant current, and the electrochemical devices of Embodiments 16-20 and Comparative Example 10 above were subjected to a cycling performance test. A charge/discharge test and the cycling performance test were respectively used to detect the stability with lithium of the electrochemical devices of Embodiments 11-15 and Comparative Example 9 of the present application and the change of capacity per gram of the electrochemical devices of Embodiments 16-20 and Comparative Example 10 after multiple cycles. Specific implementation manners of the AC impedance test, the constant current charge/discharge test and the cycling performance test will be described below.

X-Ray Diffraction Analysis:

An X-ray diffractometer (PANalytical, the Netherlands, XPertPro MPD) was used and the analysis conditions were set as follows: Cu $K_\alpha$ radiation ($\lambda$=1.5418 Å), operating current of 250 mA, continuous scanning, operating level of 40 kV, scan range $2\theta$ of 10° to 70°, step size of 0.1°, scan speed of 0.2 sec/step, to perform the diffraction analysis on the solid electrolyte material powder to confirm the phase.

AC Impedance Test:

Electrochemical impedance spectroscopy, also known as AC impedance spectroscopy, detects a corresponding response signal by applying a small-amplitude alternating voltage or current signal to the solid electrolyte to obtain impedance data for the solid electrolyte. This method applies a relatively small disturbance signal to the solid electrolyte, so the solid electrolyte is in a quasi-reversible state. The present application used an electrochemical workstation (CHI604E, Shanghai Chenhua) for the AC impedance test. First, the solid electrolyte to be tested was sandwiched between two stainless steel sheets (SUS304), and the solid electrolyte sandwiched between the stainless steel sheets was placed in the electrochemical workstation, a disturbance voltage of 10 mV (i.e., alternating voltage) was applied to perform a scanning test on the solid electrolyte in the frequency range of $10^6$-$10^{-2}$ Hz, and the ionic conductivity was recorded. In the embodiments of the present application, the ionic conductivity ($\sigma$) of the solid electrolyte can be calculated by the following formula:

$$\sigma = L/(S \times R)$$

where L, S and R are respectively the thickness of the solid electrolyte, the area of a blocking electrode (i.e. the surface area of the solid electrolyte sandwiched between the stainless steel sheets), and the resistance value in a impedance spectrum.

Constant Current Charge/Discharge Test:

The constant current charge/discharge is a charge/discharge test of an electrochemical device at a constant current. This method can be used to evaluate the electrochemical parameters such as polarization of a solid electrolyte, and is an important means for characterizing the stability of an electrochemical device. The present application used a Wuhan LAND/LANHE CT2001A system for the constant current charge/discharge test, in which the current density was 0.1 mA/cm$^2$ and the charge/discharge time interval was 1 hour, and after the electrochemical device was cycled for 30 hours, its polarizing voltage was recorded. The electrochemical devices to be tested (Comparative Example 9, Embodiments 11-15) all employed a (lithium foil/solid electrolyte/lithium foil) symmetrically combined electrode assembly to further detect the stability with lithium of the solid electrolyte.

Cycling Performance Test:

The present invention adopted a Wuhan LAND/LANHE CT2001A system to perform the cycle test on an electrochemical device. First, the electrochemical device (solid lithium-ion battery) to be tested was allowed to stand in an environment of 25±3° C. for 30 minutes and charged at a constant current at a rate of 0.05 C to a voltage of 3.75 V (rated voltage), then the electrochemical device was discharged at a rate of 0.05 C to 2.75 V, and the above charge/discharge step was repeated for 3 cycles to complete the formation of the electrochemical device to be tested. After completion of the formation of the electrochemical device, 30 charge/discharge cycles were cycled at a charge/discharge rate of 0.1 C in a voltage range of 2.75 V to 3.75 V.

Finally, the first cycle and the 30th cycle discharge capacities were recorded (in the embodiment, the capacity per gram of the cathode active substance LiFePO$_4$ was 170 mAh/g).

The discharge capacity per gram of an electrochemical device is equal to the discharge capacity/weight of the cathode active substance.

The experimental parameters and measurement results of the AC impedance test of Embodiments 1-10 and Comparative Examples 1-8 above are shown in Table 1 below.

TABLE 1

| Sample | Solid Electrolyte Material | Preparation Method of Solid Electrolyte Material | Sintering temperature (° C.) | Preparation Manner of Solid Electrolyte | Ionic Conductivity (S/cm) |
|---|---|---|---|---|---|
| Comparative Example 1 | LGPS | High-energy ball milling-annealing | 550 | Cold pressing | $1.5 \times 10^{-3}$ |
| Comparative Example 2 | Li$_{1.3}$Ba$_{0.05}$Ga$_{2.2}$P$_{0.8}$S$_6$ | High-temperature solid phase reaction | 200 | Cold pressing | N/A |
| Comparative Example 3 | Li$_{1.3}$Ba$_{0.05}$Ga$_{2.2}$P$_{0.8}$S$_6$ | High-temperature solid phase reaction | 1000 | Cold pressing | N/A |
| Comparative Example 4 | Li$_{1.3}$Ba$_{0.05}$Ga$_{2.2}$P$_{0.8}$S$_6$ | Melt quenching | 200 | Cold pressing | N/A |

TABLE 1-continued

| Sample | Solid Electrolyte Material | Preparation Method of Solid Electrolyte Material | Sintering temperature (° C.) | Preparation Manner of Solid Electrolyte | Ionic Conductivity (S/cm) |
|---|---|---|---|---|---|
| Comparative Example 5 | $Li_{1.3}Ba_{0.05}Ga_{2.2}P_{0.8}S_6$ | Melt quenching | 1000 | Cold pressing | N/A |
| Comparative Example 6 | $Li_{1.3}Ba_{0.05}Ga_{2.2}P_{0.8}S_6$ | High-energy ball milling | N/A | Cold pressing | $6.3 \times 10^{-6}$ |
| Comparative Example 7 | $Li_{1.3}Ba_{0.05}Ga_{2.2}P_{0.8}S_6$ | High-energy ball milling-annealing | 200 | Cold pressing | $6.8 \times 10^{-6}$ |
| Comparative Example 8 | $Li_{1.3}Ba_{0.05}Ga_{2.2}P_{0.8}S_6$ | High-energy ball milling-annealing | 1000 | Cold pressing | N/A |
| Embodiment 1 | $Li_{1.3}Ba_{0.05}Ga_{2.2}P_{0.8}S_6$ | High-temperature solid phase reaction | 600 | Cold pressing | $1.0 \times 10^{-4}$ |
| Embodiment 2 | $Li_{1.3}Ba_{0.05}Ga_{2.2}P_{0.8}S_6$ | High-temperature solid phase reaction | 600 | Hot pressing | $1.4 \times 10^{-4}$ |
| Embodiment 3 | $Li_{1.3}Ba_{0.05}Ga_{2.2}P_{0.8}S_6$ | Melt quenching | 700 | Cold pressing | $3.8 \times 10^{-5}$ |
| Embodiment 4 | $Li_{1.3}Ba_{0.05}Ga_{2.2}P_{0.8}S_6$ | Melt quenching | 700 | Hot pressing | $6.1 \times 10^{-5}$ |
| Embodiment 5 | $Li_{1.3}Ba_{0.05}Ga_{2.2}P_{0.8}S_6$ | High-energy ball milling-annealing | 600 | Cold pressing | $8.9 \times 10^{-5}$ |
| Embodiment 6 | $Li_{1.4}Ga_{2.2}P_{0.8}S_6$ | High-energy ball milling-annealing | 600 | Cold pressing | $5.3 \times 10^{-5}$ |
| Embodiment 7 | $Li_{1.1}Cd_{0.05}Ga_{2.1}P_{0.9}S_6$ | High-energy ball milling-annealing | 600 | Cold pressing | $1.2 \times 10^{-4}$ |
| Embodiment 8 | $Li_{0.9}Ba_{0.05}Ga_2PS_6$ | High-energy ball milling-annealing | 600 | Cold pressing | $3.3 \times 10^{-5}$ |
| Embodiment 9 | $LiGa_2PS_6$ | High-energy ball milling-annealing | 600 | Cold pressing | $9.2 \times 10^{-6}$ |
| Embodiment 10 | $Li_{1.3}Ba_{0.05}Ga_{2.2}P_{0.8}S_6$ | High-energy ball milling-annealing | 600 | Hot pressing | $1.6 \times 10^{-4}$ |

Figure 4:
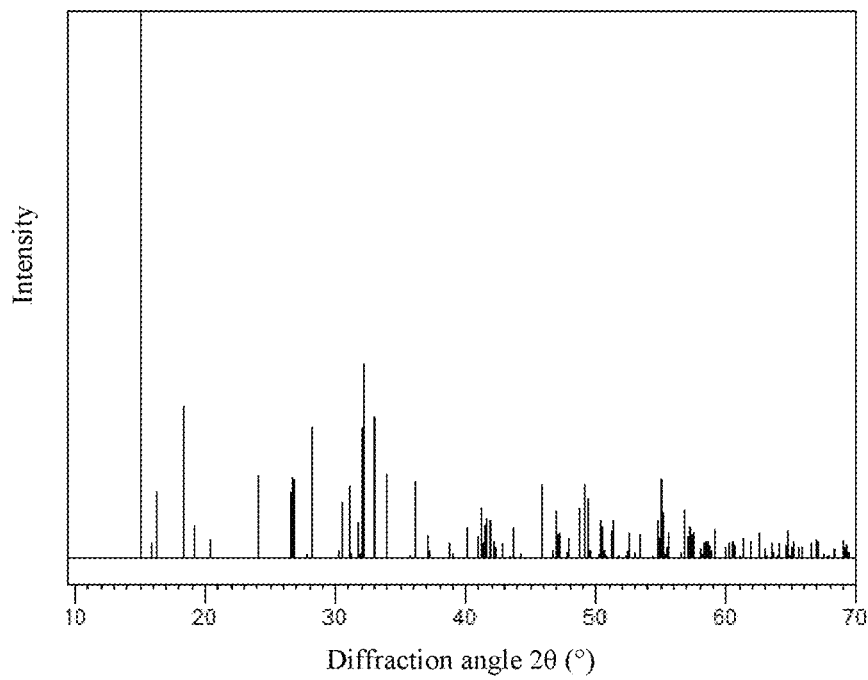
FIG. 4 is an X-ray diffraction (XRD) spectrum of the $Li_{1+2x-2y}M_yGa_{2+x}P_{1-x}S_6$ (x=0, y=0) material of the present application.
Figure 5:
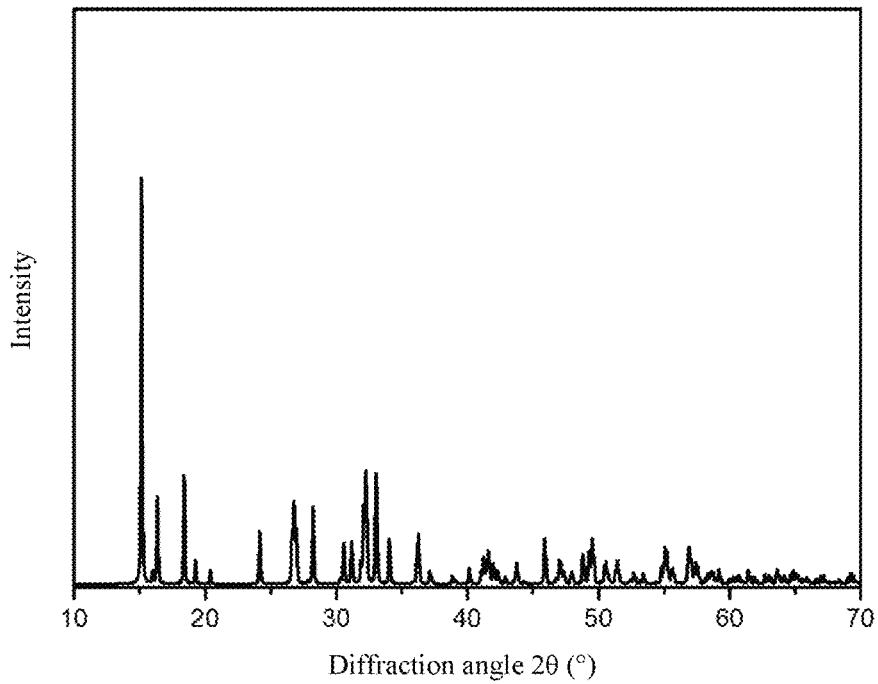
FIG. 5 is an X-ray diffraction spectrum of a solid electrolyte powder in Embodiment 1 of the present application.
Figure 6:
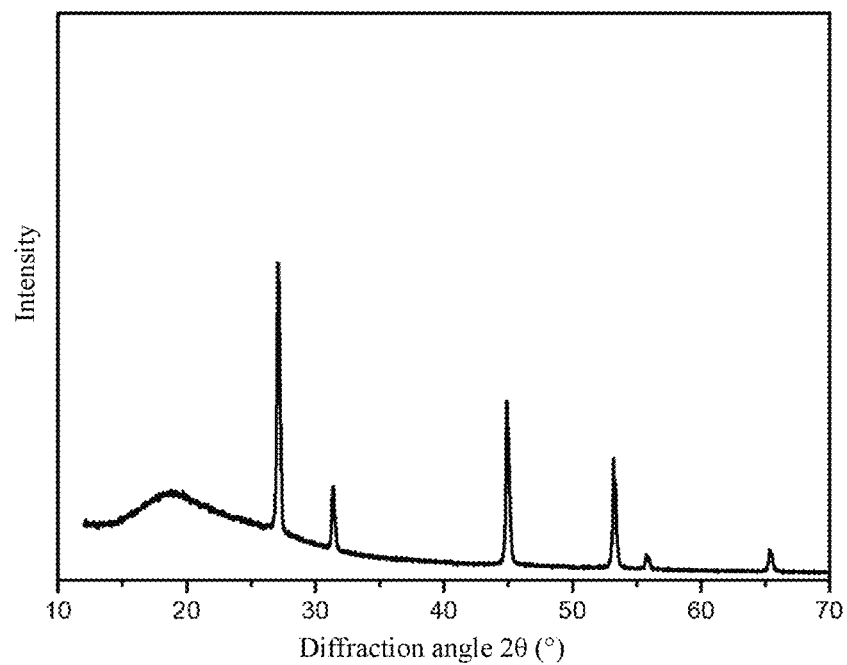
FIG. 6 is an X-ray diffraction spectrum of a solid electrolyte powder in Comparative Example 2 of the present application.
Figure 7:
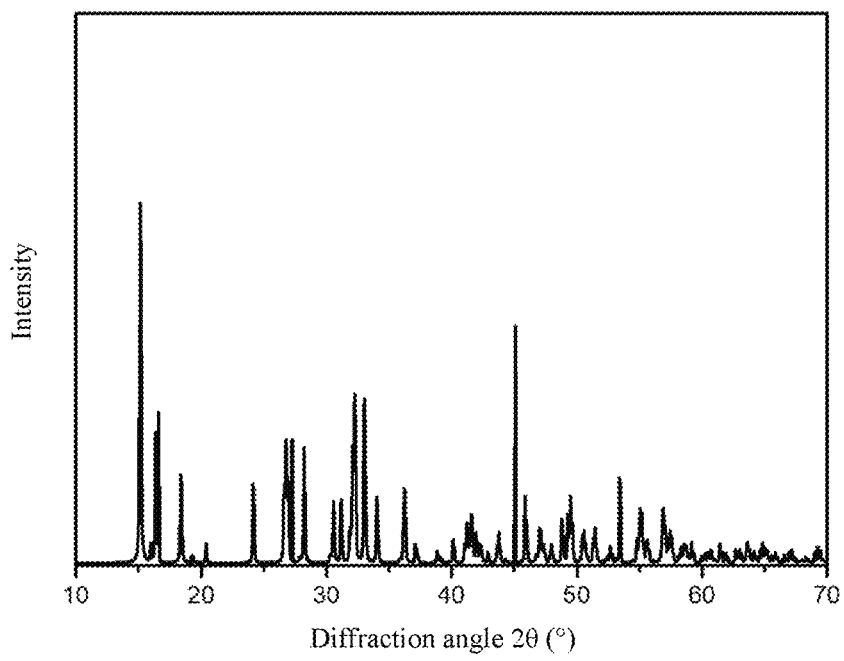
FIG. 7 is an X-ray diffraction spectrum of the solid electrolyte powder in Comparative Example 3 of the present application.

FIG. 4 is a theoretical XRD simulation spectrum of a $LiGa_2PS_6$ material, and FIG. 5 to FIG. 7 are respectively X-ray diffraction spectra of solid electrolyte powder in Embodiment 1 and Comparative Examples 2 and 3 of the present application. As shown in FIG. 5, the diffraction spectrum of the solid electrolyte material powder of Embodiment 1 of the present application has a good correspondence relationship with the dispersion and numerical values of the respective peak positions in FIG. 4, which indicates that the solid electrolyte powder of Embodiment 1 of the present application has a crystal structure of a diamond-like structure and is a pure phase. In contrast, as shown in FIG. 6, the diffraction spectrum of the solid electrolyte material powder in Comparative Example 2 of the present application contains a large number of raw material peak positions, which does not correspond at all to FIG. 4. Furthermore, as shown in FIG. 7, the diffraction spectrum of the solid electrolyte material powder in Comparative Example 3 contains strong peaks at 27°, 45° and other positions in addition to the peak positions in FIG. 4. This indicates that the solid electrolyte powder of Comparative Examples 2 and 3 of the present application does not have a $Li_{1+2x-2y}M_yGa_{2+x}P_{1-x}S_6$ type crystal structure and is not pure phase.

In Table 1, since the pure phases of the $Li_{1+2x-2y}M_yGa_{2+x}P_{1-x}S_6$ material could not be obtained in Comparative Examples 2-5 and 8, the ionic conductivity test thereto could not be conducted. By comparing Comparative Examples 2-8 and Embodiments 1-10, it can be known that in the preparation of the solid electrolyte material ($Li_{1+2x-2y}M_yGa_{2+x}P_{1-x}S_6$) of the present application, whether the solid electrolyte material preparation method is a high-temperature solid phase reaction method, a melt quenching method or a high-energy ball milling-annealing method, the sintering temperature has a decisive influence on the ion conductivity of the prepared solid electrolyte material. Specifically, when the sintering temperature is too low (<550° C.), the energy of the system is insufficient to cause the breaking of an old bond and the formation of a new bond to proceed normally, and a pure phase of the solid electrolyte material ($Li_{1+2x-2y}M_yGa_{2+x}P_{1-x}S_6$) cannot be obtained. When the sintering temperature is higher than the decomposition temperature (>800° C.) of the material, the material will decompose. By comparing Comparative Examples 6-8 and Embodiment 5, it can be seen that after preparing the solid electrolyte material ($Li_{1+2x-2y}M_yGa_{2+x}P_{1-x}S_6$) by the high-energy ball milling method, an amorphous material can be crystallized by annealing treatment (as shown in Embodiment 5), and multi-directional lithium ion conduction pathways arranged regularly can be constructed. The solid electrolyte of Embodiment 5 of the present application has significantly improved ionic conductivity as compared with Comparative Example 6. Meanwhile, compared with Comparative Examples 7 and 8, if the sintering temperature of the annealing treatment used is too low (<550° C.) or too high (>800° C.), the prepared solid electrolyte material cannot reach a certain ionic conductivity.

By comparing Embodiments 1 and 2, Embodiments 3 and 4, and Embodiments 5 and 10, it can be known that the solid electrolyte prepared by hot pressing after mixing the solid electrolyte material ($Li_{1+2x-2y}M_yGa_{2+x}P_{1-x}S_6$) of the present application with a binder has high ionic conductivity.

Besides, according to the ionic conductivity of each solid electrolyte powder of Comparative Example 1 and Embodiments 1-10 in Table 1, the ionic conductivity of the LGPS material synthesized in Comparative Example 1 is about $1.5 \times 10^{-3}$ S/cm, which is slightly less than the numerical value reported in the literature (12 mS/cm). This may be caused by different operating methods during material preparation. Furthermore, the solid electrolyte materials of Embodiments 1-10 still have a certain degree of lithium ion conductivity, where the ionic conductivity of the solid electrolyte materials in each of the embodiments is maintained within the range of about $10^{-6}$ S/cm to about $10^{-4}$ S/cm.

The experimental parameters and measurement results of the constant current charge/discharge test performed on the electrochemical devices of Embodiments 10-15 and Comparative Example 9 above are shown in Table 2 below.

TABLE 2

| Sample | Solid Electrolyte Material | Preparation Method of Solid Electrolyte Material | Preparation Manner of Solid Electrolyte | Initial Polarizing Voltage (V) | Polarizing Voltage After 30 h of Cycle (V) | Stability with Lithium |
|---|---|---|---|---|---|---|
| Comparative Example 9 | LGPS | High-energy ball milling-annealing | Cold pressing | 0.02 | 0.24 | Unstable |
| Embodiment 11 | $Li_{1.3}Ba_{0.05}Ga_{2.2}P_{0.8}S_6$ | High-temperature solid phase reaction | Cold pressing | 0.095 | 0.081 | Stable |
| Embodiment 12 | $Li_{1.3}Ba_{0.05}Ga_{2.2}P_{0.8}S_6$ | Melt quenching | Cold pressing | 0.135 | 0.122 | Stable |
| Embodiment 13 | $Li_{1.3}Ba_{0.05}Ga_{2.2}P_{0.8}S_6$ | High-energy ball milling-annealing | Cold pressing | 0.12 | 0.098 | Stable |
| Embodiment 14 | $Li_{1.1}Cd_{0.05}Ga_{2.1}P_{0.9}S_6$ | High-energy ball milling-annealing | Cold pressing | 0.09 | 0.081 | Stable |
| Embodiment 15 | $Li_{1.3}Ba_{0.05}Ga_{2.2}P_{0.8}S_6$ | High-energy ball milling-annealing | Hot pressing | 0.08 | 0.065 | Stable |

Figure 8:
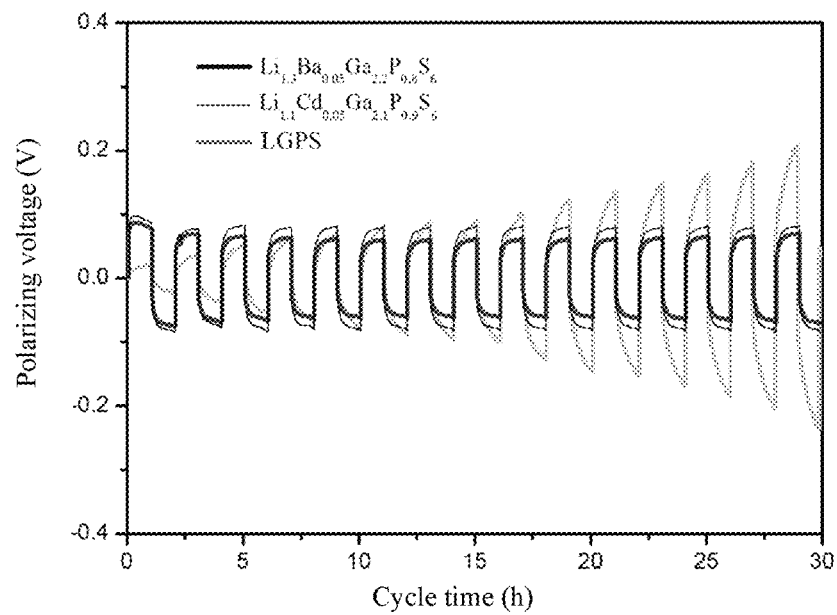
FIG. 8 is a curve diagram showing a time-dependent change of a charge/discharge voltage of an electrochemical device in Comparative Example 9 and Embodiments 14 and 15 of the present application.

Table 2 lists the results of the constant current charge/discharge test on the electrochemical devices of Comparative Example 9 and Embodiments 11-15 of the present application. FIG. 8 is a curve diagram showing the time-dependent change of the charge/discharge voltage (i.e., polarizing voltage) in a constant current charge/discharge test of the solid electrolytes of Comparative Example 9 and Embodiments 14 and 15 of the present application.

As shown in FIG. 8, the LGPS material in Comparative Example 9 shows a sharply increasing polarization phenomenon in the constant current charge/discharge test. After 30 hours of cycle, the polarizing voltage of the LGPS material increased from 0.02 V to 0.24 V. In contrast, in the first 30 hours of the cycle, the polarizing voltages of the solid electrolyte materials ($Li_{1.1}Cd_{0.05}Ga_{2.1}P_{0.9}S_6$ and $Li_{1.3}Ba_{0.05}Ga_{2.2}P_{0.8}S_6$) in Embodiments 14 and 15 respectively approached a stable value of 0.081 V and 0.065 V, showing good stability with lithium. Furthermore, by comparing Comparative Examples 11-13, it can be known that the solid electrolyte materials prepared by different synthesis methods have different polarizing voltages in the constant current charge/discharge cycle. This is mainly because the ionic conductivity of the solid electrolytes prepared by different synthesis methods is different, that is, their bulk impedances are different. However, compared with Comparative Example 9, the solid electrolytes of Embodiments 11-15 exhibited a relatively stable polarizing voltage in the charge/discharge cycle, that is, excellent stability with lithium.

The experimental parameters and measurement results of the cycling performance test on the electrochemical devices of Embodiments 16-20 and Comparative Example 10 above are shown in Table 3 below.

TABLE 3

| Sample | Solid Electrolyte Material | Preparation Method of Solid Electrolyte Material | First Cycle Discharge Capacity Per Gram (mAh/g) | 30th Cycle Discharge Capacity Per Gram (mAh/g) |
|---|---|---|---|---|
| Comparative Example 10 | LGPS | High-energy ball milling-annealing | 128.6 | 46.5 |
| Embodiment 16 | $Li_{1.3}Ba_{0.05}Ga_{2.2}P_{0.8}S_6$ | High-temperature solid phase reaction | 50.8 | 39.9 |
| Embodiment 17 | $Li_{1.3}Ba_{0.05}Ga_{2.2}P_{0.8}S_6$ | Melt quenching | 38.2 | 25.7 |
| Embodiment 18 | $Li_{1.3}Ba_{0.05}Ga_{2.2}P_{0.8}S_6$ | High-energy ball milling-annealing | 47.6 | 37.3 |
| Embodiment 19 | $Li_{1.1}Cd_{0.05}Ga_{2.1}P_{0.9}S_6$ | High-energy ball milling-annealing | 52.7 | 42.6 |
| Embodiment 20 | $Li_{1.3}Ba_{0.05}Ga_{2.2}P_{0.8}S_6$ | High-energy ball milling-annealing | 54.3 | 44.8 |

Figure 9:
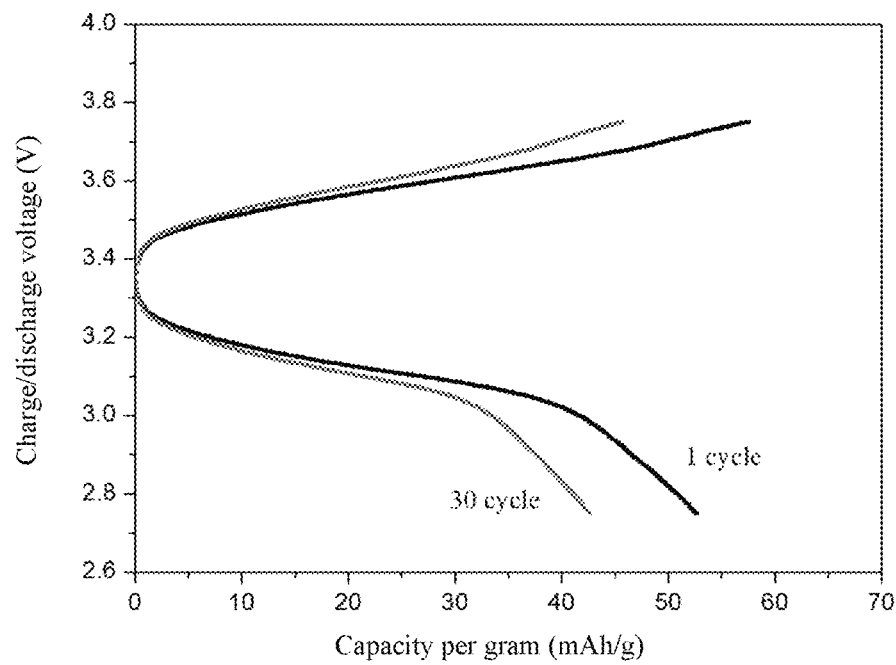
FIG. 9 is a curve diagram showing a capacity per gram and charge/discharge voltage of an electrochemical device in Embodiment 19 of the present application.
Figure 10:
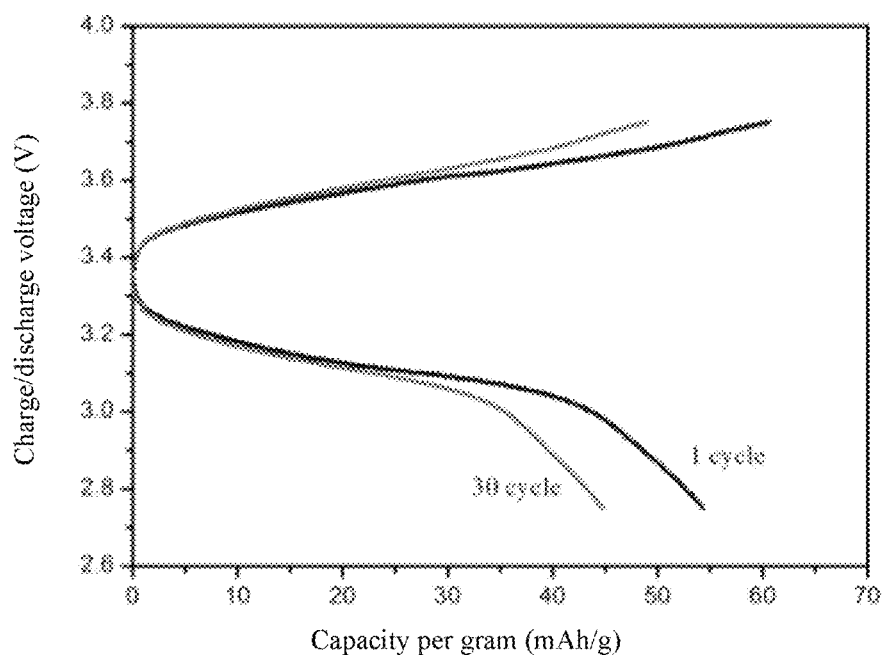
FIG. 10 is a curve diagram showing a capacity per gram and charge/discharge voltage of an electrochemical device in Embodiment 20 of the present application.

Table 3 lists the results of the cycling performance test on the electrochemical devices of Comparative Example 10 and Embodiments 16-20 of the present application. FIG. 9 and FIG. 10 are respectively curve diagrams of the capacity per gram and the charge/discharge voltage of the electrochemical devices in Embodiment 19 and Embodiment 20 of the present application.

As shown in FIG. 9 and FIG. 10, in the cycle voltage range of 2.75 V to 3.75 V, after three cycles of formation at a charge/discharge rate of 0.05 C (41 µA/cm$^2$), the electrochemical devices of Embodiments 19 and 20 were subjected to 30 charge/discharge cycles at a charge/discharge rate of 0.1 C (82 µA/cm$^2$), where the first cycle discharge capacity per gram and the 30th cycle discharge capacity per gram of the electrochemical device were respectively 52.7/42.6 mAh/g and 54.3/44.8 mAh/g, and the capacity retention rates were respectively 80.8% and 82.5%. Furthermore, by Comparing Embodiments 16-18 and Comparative Example 10, it can be known that the electrochemical devices assembled from materials prepared by different preparation methods have different charge/discharge capacities due to their different bulk impedances, but their cycle capacity retention rates (78.5%, 67.2% and 78.4%, respectively) are far higher than those of the LGPS material (36.2%). It can be seen from the above that the solid electrolyte material provided by the embodiments of the present application and the electrochemical device comprising the same have better electrochemical cycling performance.

Through the description of the embodiments and comparative examples of the present application, it should be understood that the present application provides a novel sulfur-phosphorus compound solid electrolyte and a synthesis method thereof. The solid electrolyte is relatively simple in composition and is free of the expensive metal element germanium (Ge), and the solid electrolyte preparation process is easy to operate and lower in synthesis cost. The solid electrolyte has ionic conductivity at room temperature of 10$^{-6}$ to 10$^{-4}$ S/cm, and has good stability with lithium and electrochemical performance.

References throughout the specification of the present application to "embodiments", "partial embodiments," "an embodiment," "another example", "examples", "specific examples" or "partial examples" mean that at least one embodiment or example in the embodiments of the present application includes specific features, structures, materials or characteristics described in the embodiment or example. Therefore, descriptions appearing throughout the specification, such as "in some embodiments", "in the embodiments", "in an embodiment", "in another example", "in an example", in a particular example" or "examples", are not necessarily referring to the same embodiments or examples in the embodiments of the present application. Furthermore, the specific features, structures, materials or characteristics in the descriptions can be combined in any suitable manner in one or more embodiments or examples.

The above description summarizes the features of several embodiments, which enables those of ordinary skill in the art to understand the various aspects of the present application. Those of ordinary skill in the art can readily take the present application as a basis for designing or modifying other compositions to achieve the same objectives and/or the same advantages as the embodiments herein. It is also to be understood by those of ordinary skill in the art that these equal examples do not depart from the spirit and scope of the present application, and it is possible to make various changes, substitutions and modifications to the present application without departing from the spirit and scope of the present application. Although the methods disclosed herein have been described with reference to the specific operations that are performed in a specific order, it should be understood that these operations can be combined, subdivided, or reordered to form an equivalent method without departing from the teachings of the present application. Therefore, unless otherwise specifically indicated herein, the order and grouping of operations shall not be construed as any limitation on the present application.

What is claimed is:

1. An electrolyte comprising a solid electrolyte, wherein the solid electrolyte comprises a solid electrolyte material being represented by a chemical formula of $Li_{1+2x-2y}M_yGa_{2+x}P_{1-x}S_6$, wherein M is selected from a group consisting of Sr, Ba, Zn, Cd and a combination thereof, $0 \leq x \leq 0.2$ and $0 \leq y \leq 0.05$.

2. The electrolyte according to claim 1, wherein the solid electrolyte material belongs to a monoclinic crystal system and has a crystal structure of a diamond-like structure.

3. The electrolyte according to claim 2, wherein the crystal structure is composed of corner-sharing tetrahedral structural units.

4. The electrolyte according to claim 2, wherein a space group of the crystal structure of the solid electrolyte material is Cc, and primitive vectors of a unit cell of the crystal structure are a=11.373±0.5 Å, b=6.946±0.5 Å and c=11.401±0.5 Å.

5. The electrolyte according to claim 1, further comprising a binder, wherein a mass percentage of the binder is about 10% to about 20% based on a total mass of the solid electrolyte, and the binder is selected from a group consisting of polypropylene, polyethylene, poly(ethylene oxide), polyphenylene oxide, polyvinylidene fluoride, a vinylidene fluoride-hexafluoropropylene copolymer, polyamide, polyacrylonitrile, polyacrylate ester, polyacrylic acid, polyacrylate salt, carboxymethyl cellulose sodium, polyvinylpyrrolidone, polyvinyl ether, polymethyl methacrylate, polytetrafluoroethylene, polyhexafluoropropylene, styrene-butadiene rubber and a combination thereof.

6. The electrolyte according to claim 1, wherein the solid electrolyte material has ionic conductivity of about 10$^{-6}$ S/cm to about 10$^{-4}$ S/cm and a lithium ion migration barrier of less than about 0.4 eV.

7. A method for preparing the electrolyte according to claim 1, the method comprising the following steps:
mixing a lithium (Li)-containing material, an M-containing material, a gallium (Ga)-containing material, a phosphorus (P)-containing material and a sulfur (S)-containing material according to a stoichiometric ratio of $Li_{1+2x-2y}M_yGa_{2+x}P_{1-x}S_6$ to form a mixture, wherein M is selected from the group consisting of Sr, Ba, Zn, Cd and a combination thereof, $0 \leq x \leq 0.2$ and $0 \leq y \leq 0.05$;
heating the mixture to a solid phase reaction critical temperature, and then cooling to obtain the solid electrolyte material; and
forming the solid electrolyte by using the solid electrolyte material.

8. The method according to claim 7, wherein the step of heating the mixture to a solid phase reaction critical temperature comprises heating the mixture to a range from about 550° C. to about 800° C.

9. The method according to claim 7, wherein the step of forming the solid electrolyte by using the solid electrolyte material further comprises:
conducting a cold pressing or hot pressing process on the solid electrolyte material to form the solid electrolyte.

10. The method according to claim 9, wherein the step of forming the solid electrolyte by using the solid electrolyte material further comprises: mixing a binder with the solid electrolyte material before conducting the cold pressing or hot pressing process, wherein the mass percentage of the binder is about 10% to about 20% based on the total mass of the solid electrolyte, and the binder is selected from the group consisting of polypropylene, polyethylene, poly(ethylene oxide), polyphenylene oxide, polyvinylidene fluoride, a vinylidene fluoride-hexafluoropropylene copolymer, polyamide, polyacrylonitrile, polyacrylate ester, polyacrylic acid, polyacrylate salt, carboxymethyl cellulose sodium, polyvinylpyrrolidone, polyvinyl ether, polymethyl methacrylate, polytetrafluoroethylene, polyhexafluoropropylene, styrene-butadiene rubber and a combination thereof.

11. An electrochemical device, comprising:
a cathode;
an anode; and
a solid electrolyte, wherein the solid electrolyte comprises a solid electrolyte material being represented by a chemical formula of $Li_{1+2x-2y}M_yGa_{2+x}P_{1-x}S_6$, wherein M is selected from a group consisting of Sr, Ba, Zn, Cd and a combination thereof, $0 \leq x \leq 0.2$ and $0 \leq y \leq 0.05$.

12. The electrochemical device according to claim 11, wherein the solid electrolyte material belongs to a monoclinic crystal system and has a crystal structure of a diamond-like structure.

13. The electrochemical device according to claim 12, wherein the crystal structure is composed of corner-sharing tetrahedral structural units.

14. The electrochemical device according to claim 12, wherein a space group of the crystal structure of the solid electrolyte material is Cc, and primitive vectors of a unit cell of the crystal structure are a=11.373±0.5 Å, b=6.946±0.5 Å and c=11.401±0.5 Å.

15. The electrochemical device according to claim 11, further comprising a binder, wherein a mass percentage of the binder is about 10% to about 20% based on a total mass of the solid electrolyte, and the binder is selected from a group consisting of polypropylene, polyethylene, poly(ethylene oxide), polyphenylene oxide, polyvinylidene fluoride, a vinylidene fluoride-hexafluoropropylene copolymer, polyamide, polyacrylonitrile, polyacrylate ester, polyacrylic acid, polyacrylate salt, carboxymethyl cellulose sodium, polyvinylpyrrolidone, polyvinyl ether, polymethyl methacrylate, polytetrafluoroethylene, polyhexafluoropropylene, styrene-butadiene rubber and a combination thereof.

16. The electrochemical device according to claim 11, wherein the solid electrolyte material has ionic conductivity of about $10^{-6}$ S/cm to about $10^{-4}$ S/cm and a lithium ion migration barrier of less than about 0.4 eV.

17. An electronic device, comprising a electrochemical device, wherein the electrochemical device comprises:
a cathode;
an anode; and
a solid electrolyte, wherein the solid electrolyte comprises a solid electrolyte material being represented by a chemical formula of $Li_{1+2x-2y}M_yGa_{2+x}P_{1-x}S_6$, wherein M is selected from a group consisting of Sr, Ba, Zn, Cd and a combination thereof, $0 \leq x \leq 0.2$ and $0 \leq y \leq 0.05$.

18. The electronic device according to claim 17, wherein the solid electrolyte material belongs to a monoclinic crystal system and has a crystal structure of a diamond-like structure, the crystal structure is composed of corner-sharing tetrahedral structural units, a space group of the crystal structure of the solid electrolyte material is Cc, and primitive vectors of a unit cell of the crystal structure are a=11.373±0.5 Å, b=6.946±0.5 Å and c=11.401±0.5 Å.

19. The electronic device according to claim 17, further comprising a binder, wherein a mass percentage of the binder is about 10% to about 20% based on a total mass of the solid electrolyte, and the binder is selected from group consisting of polypropylene, polyethylene, poly(ethylene oxide), polyphenylene oxide, polyvinylidene fluoride, a vinylidene fluoride-hexafluoropropylene copolymer, polyamide, polyacrylonitrile, polyacrylate ester, polyacrylic acid, polyacrylate salt, carboxymethyl cellulose sodium, polyvinylpyrrolidone, polyvinyl ether, polymethyl methacrylate, polytetrafluoroethylene, polyhexafluoropropylene, styrene-butadiene rubber and a combination thereof.

20. The electronic device according to claim 17, wherein the solid electrolyte material has ionic conductivity of about 10'S/cm to about 10'S/cm and a lithium ion migration barrier of less than about 0.4 eV.

* * * * *